United States Patent
Kowbel

(10) Patent No.: US 11,795,114 B1
(45) Date of Patent: Oct. 24, 2023

(54) PROCESS FAR REVOLUTIONARY, VERY THICK AND VERY HIGH THERMAL CONDUCTIVITY CARBON-CARBON COMPOSITES

(71) Applicant: Witold Kowbel, Tucson, AZ (US)

(72) Inventor: Witold Kowbel, Tucson, AZ (US)

(73) Assignee: Witold Kowbel, Tucson, AZ (US)

( * ) Notice: Subject to any disclaimer, the term of this patent is extended or adjusted under 35 U.S.C. 154(b) by 100 days.

(21) Appl. No.: 17/300,724

(22) Filed: Oct. 5, 2021

Related U.S. Application Data

(60) Provisional application No. 63/204,735, filed on Oct. 22, 2020.

(51) Int. Cl.
 *C04B 35/83* (2006.01)
 *C04B 35/626* (2006.01)
 *C04B 35/628* (2006.01)
 *C04B 35/64* (2006.01)
 *C09K 5/14* (2006.01)

(52) U.S. Cl.
 CPC .......... *C04B 35/83* (2013.01); *C04B 35/6264* (2013.01); *C04B 35/6265* (2013.01); *C04B 35/62873* (2013.01); *C04B 35/62886* (2013.01); *C04B 35/62892* (2013.01); *C04B 35/64* (2013.01); *C09K 5/14* (2013.01); *C04B 2235/422* (2013.01); *C04B 2235/48* (2013.01); *C04B 2235/5248* (2013.01); *C04B 2235/5256* (2013.01); *C04B 2235/616* (2013.01); *C04B 2235/656* (2013.01); *C04B 2235/9607* (2013.01)

(58) Field of Classification Search
 CPC ............................ C04B 35/83; C04B 35/6265
 See application file for complete search history.

(56) References Cited

U.S. PATENT DOCUMENTS

| | | | |
|---|---|---|---|
| 4,902,453 A | 2/1990 | Okura | |
| 5,057,254 A | 10/1991 | Sochda | |
| 5,206,085 A | 4/1993 | Nakagawa | |
| 6,051,167 A * | 4/2000 | Withers | .................. C04B 35/83 427/249.4 |
| 6,410,088 B1 | 6/2002 | Robin-Brosse | |

(Continued)

FOREIGN PATENT DOCUMENTS

CN 33835A1111 8/2020

OTHER PUBLICATIONS

Feng et al., "The effect of carbonyl, carboxyl and hydroxyl groups on the capacitance of carbon nanotubes," 2011, New Carbon Materials 26(3), pp. 224-228. (Year: 2011).*

(Continued)

*Primary Examiner* — Robert A Vetere

(57) ABSTRACT

This innovation provides for a revolutionary advancement in the area of very thick and very high thermal conductivity carbon-carbon (C—C) composites for both commercial and military. Novel, surface treated to achieve desired chemistry, exhibiting no agglomeration, carbon-based fillers are used enabling stable slurries up to 45 wt % solids to be used in the composite pre-pregging for 1-D and 2-D, 2-5 D and 3-D preforms infiltration. The need for carbonization is eliminated. No closed porosity C—C composites are produced. Up to 12" thick C—C composites with no density gradient and thermal conductivity in excess of 650 W/mK were fabricated via chemically induced graphitization.

8 Claims, 2 Drawing Sheets

(56) References Cited

U.S. PATENT DOCUMENTS

| | | |
|---|---|---|
| 7,207,424 B2 | 4/2007 | Dai-Huang |
| 10,913,352 B2 | 2/2021 | Best |
| 2010/0078839 A1 | 4/2010 | Simpson |

OTHER PUBLICATIONS

Zhao et al., "Multiple functionalization of multi-walled carbon nanotubes with carboxyl and amino groups," 2013, Appl. Surface Sci. 276, pp. 476-481. (Year: 2013).*

Krenkel, Ceramic Matrix Composites, 2008, pp. 69-111, Viley-VCH, Germany.

Dresselhaus, Graphite Fibers and Filaments, pp. 35-84, Springer-Verlag, Germany.

Kowbel, Influence of Graphitization Environment of PAN-based Carbon Fibers on Microstructure, Carbon, 1989, pp. 219-226, vol. 27, Pergamon Press, Great Britain.

Kowbel, CVD and CVR Silicon based Functionally Graded Coatings on CC Composites, Carbon, 1995, pp. 415-436, Elsevier Science Ltd, Great Britain.

Feng, Effect of High Temperature Treatment,,,, New Carbon Materials, 2014,pp. 357-362, vol. 29, Elsevier, Great Britain.

Newcomb, Processing, structure and properties of carbon tibers, Composites:Part a, 2016, pp. 262-282, Elsevier, Great Britain.

Kowbel, The mechanism of Oxidation protection of C/C . . . , Ceramic Transactions, 1993, pp. 237-244, vol. 34, The American Ceramic Society, USA.

Kowbel, Oxidation protection of C/C composites . . . , ASME AD 25-1, 1991, pp. 65-76, vol. 1 ASME, USA.

Ohlhorst, Development of X-43A . . . , IAC-05, D2-5.06, AIAA USA.

Glass, Testing of DRL . . . , Proceedings of 19th Int. Space Planes . . . , AIAA 2014-3089, AIAA USA.

Kobayashi, Tensile Strength of . . . , Proceedings ICCM-17, 2009, Royal Chemical Society, Great Britain.

Across CC Brochure, 2021, www.across.com.

SGL CC Brochure, 2021, www.sglcarbon.com.

TOYO TANSO CC Brochure, 2021, www.toyotanso.com.

\* cited by examiner

PROCESS FAR REVOLUTIONARY, VERY THICK AND VERY HIGH THERMAL CONDUCTIVITY CARBON-CARBON COMPOSITES

BACKGROUND OF THE INVENTION

1. Field of the Invention

The present invention relates to novel processing of carbon-carbon (C—C) composites resulting in a new class of C—C composites for thermal and thermal-structural applications exhibiting greatly superior thermal and mechanical properties over the prior art C—C composites at the thickness up to 12" and having no closed porosity.

2. Description of the Prior Art

Carbon microstructure determines physical, mechanical and thermal properties of carbon materials. There are three types of carbon microstructure: graphitic [Dresselhaus 1988], turbostratic [Dresselhaus 1988] and vitreous [Krenkel 2008]. The three types of carbon microstructure are profoundly different. Vitreous carbon is composed of extremely small, randomly oriented basic carbon structural unit about 1 nm in size. The net result, vitreous carbon has extremely low gas permeability. Turbostratic carbons are composed of larger, a few nanometers in size basic structural unit, but again randomly oriented. Thus, gas permeability is higher than that of vitreous carbon. Graphitic structures have significantly larger basic structural unit than turbostratic carbons and exhibit significant degree of orientation. Thus, they exhibit much higher gas permeability than turbostratic carbons.

There are five microstructural parameters, which characterize carbon microstructure: crystalline stack width, $L(a)$, crystalline stack length $L(c)$, $d$ (002) spacing, preferred orientation, Z and degree of graphitization, g [Dresselhaus 1988, Feng2014]. Thermal conductivity of carbon materials was correlated with their crystalline parameters [Feng 2014]. The increase in $L(a)$ and decrease in $d(002)$ significantly increases thermal conductivity. Due to their microstructure only, graphitic carbons exhibit high to very high thermal conductivity, turbostratic carbons exhibit low to moderate thermal conductivity, while virtuous carbons exhibit extremely low thermal conductivity.

There are two types of carbon fibers: PAN-based and pitch-based with their properties discussed in detail [Newcomb 2016]. Pitch fibers due to their graphitic microstructure exhibit up to 800 W/mK thermal conductivity, while PAN-based fibers due to their turbostratic microstructure exhibit only up 160 W/mK thermal conductivity.

Carbon-carbon composites utilize reinforcement in the form of carbon fibers in conjunction with carbon matrix [Krenkel 2008]. Thus, since they are all carbon, they exhibit low density. Also, the unique microstructure of carbon matrix and carbon fibers results in the most unique behavior of carbon-carbon composites as manifested by increase in in-plane mechanical properties with increasing temperature [Kobayashu 2009]. Also, the use of pitch-based carbon fibers enable the manufacture of high thermal conductivity C—C composites [Feng 2014].

There are two prior art principles involved in carbon graphitization: i) heat induced graphitization [Dresselhaus 1988], ii) physically induced graphitization by the highly localized (limited a few hundred nano meters only) shrinkage stress of phenolic-derived carbon matrix [Krenkel 2008] and physically induced increase in in $L(c)$ and decrease in d (002) (still in turbostratic not graphitic carbon range) imposed by pitch-derived carbon matrix on PAN-based carbon fibers, which resulted in very minimum microstructural changes insufficient to significantly increase their thermal conductivity [Kowbel 1989]. C—C composites due to their unique properties found applications in thermal-structural applications, eg. furnace fixtures, thermal applications, e.g., nose tips and leading edges and frictional applications [Krenkel 2008].

There are three main C—C composites applications in the most emerging air breathing vehicles, i) thermal applications such as leading edges [Ohlhorst 2005], ii) thermo-structural applications as hot, load bearing structures to replace passive insulations and thermal blankets [U.S. Pat. No. 10,913, 552] and iii) scramjet engine combustors [Glass 2014]. In thermal applications the higher the thermal conductivity the lower the stagnation point, enabling the use of commercial coatings as the oxidation protection and the lower the thermally induced stress enabling the operation under higher heat fluxes. Thus, as high as 3000° C. heat treatment was used to render high thermal conductivity C—C composites [Feng 2014]. In thermo-structural applications high mechanical properties are needed to achieve load bearing capabilities, while high thermal conductivity combined with low modulus is needed to minimize thermally induced stresses. That requirement limits the heat treatment temperature to around 2200° C. since at higher temperature carbon fiber modulus significantly increases.

C—C composites processing involves the following steps: consolidation, densification, two heat treatments; carbonization and graphitization steps [Krenkel 2014]. There are two main classes of consolidation; using thermoset resins and thermoplastic resins and three types of densifications; thermoset-based, thermoplastic based and Chemical Vapor Infiltration (CVI) [Krenkel 2008 and U.S. Pat. Nos. 6,410,088 and 20,100,078,839]. There are two classes of thermoset consolidation: i) pure thermoset [Krenkel 2008], and ii) thermoset with the addition of organic solvent soluble, non-functional, non-crystalline filler, e.g green carbon coke [U.S. Pat. No. 6,051,167]. There are also two classes of thermoplastic consolidation: i) hot pressing of pitches [Krenkel 2008, U.S. Pat. No. 5,057,254 and US Patent 7,20742,482] ii) hot pressing with a mixture of pre-oxidized mesophase pitch powders and pitch [Krenkel 2008, U.S. Pat. Nos. 4,902,453 and 5,206,085 and ACROSS Brochure 2021]. Precursors used for carbon matrix need to satisfy at least eight conditions, with high carbon yield as the primary criterion, [Krenkel 2008]. That main criterion limits the selection of thermoset resins used either for consolidation and or densification to a few only: phenolics, phenolic furfuryl alcohol, polyethylenes, and polyarylacetylenes, [Krenkel 2008].

Use of non-functional, non-crystalline organic solvent soluble fillers impose severe process limitations, U.S. Pat. No. 6,051,167. These fillers are intrinsically incapable of achieving stable, high solid content carbon slurries. These fillers as used in commercial and military applications contain only hydrogen attached to carbon surface atoms. Presence of only surface hydrogen group is insufficient to create steric stabilization. As the result even very low loading, under 10 wt % results in agglomeration and sedimentation. As the result very uneven distribution of the filler in both intra and interbundle matrix exists which in combination with vitreous carbon matrix results in the creation of very significant closed porosity making the fabrication of very high-density thick C—C composites a physical impossibility. In addition, presence of only surface hydrogen groups results only in very weak bonding between the filler and the resin, insufficient to improve graphitization process and mechanical properties.

Prior art molding with thermoset resins methods intrinsically prohibits achieving high fiber volume in thick C—C composites, U.S. Pat. No. 6,051,167. High fiber volume is critical to achieving high in plane mechanical properties critical to thermal structural applications and high thermal conductivity critical to thermal applications.

Prior art pitch densification intrinsically prohibits infiltration of very small size pores critical to achieving very high density and very low open porosity, US Patent 20100078839, thus very high-density C—C composites cannot be obtained.

Prior art processing of thick C—C composites using either thermoset or thermoplastic consolidation methods is intrinsically incapable of making thick C—C composites with no significant density gradients, no significant open porosity gradient, no very significant scatter of mechanical properties and no micro delamination.

In the case of thermoset consolidation, the charring mechanism shrinks the matrix from the fiber and vitreous matrix is formed [Krenkel 2008]. As a result, very significant gradient in properties is created, since the open porosity distribution contains a large number of small pores rendering densification of thick parts intrinsically impossible and resulting in more open porosity at the composite center. Also, thermoset based consolidation due to the combination of charring mechanism and fact that it forms vitreous carbon, virtually no gas permeability, intrinsically forms closed porosity. In the case of thick C—C composites closed porosity size and amount significantly increases, due to increased formation probability. further contributing to huge gradient in properties. In addition, in the case of thick C—C composites, the small size of open porosity obstructs the out gassing upon charring during carbonization causing micro delamination.

In the case of thermoplastic consolidation, during charring process matrix stays on the fiber and creates graphitic microstructure [Krenkel 2008, Dresselhaus]. 1988]. However, as the thickness of the composite increases the porosity size towards the center decreases resulting in the intrinsic density and other properties significant gradient. Also, the decrease of the porosity size obstructs the out gassing upon carbonization resulting in micro-delamination.

Prior art processing schemes imposed severe limitations on the applications of C—C composites in both thermal and thermal-mechanical applications.

In thermal applications there are seven major intrinsic limitations: i) very expensive, very low production capacity, weavable pitch-based fibers, e.g P-30 X are required [Ohlhorst 2005, Feng 2014], ii) only 1.95 g/cm$^3$ density achieved limited to very thin C—C composites [Feng 2014], iii) maximum achieved thermal conductivity is only 445 W/mK on very thin C—C composites [Feng 2014]., iv) degree of graphitization parameter g of only 0.9 [Feng 2014] on very thin C—C composites, v) thick C—C composites for thermal applications suffer from very significant properties gradient through the thickness due to intrinsic difficulty of prior art molding and densification methods to achieve virtually no open porosity and no density gradient through the thick composite cross section. No very thick C—C composites without significant open porosity and density gradient were ever reported in the prior art for thermal applications, vi) machining of thermal leading edges made with thermoset consolidation intrinsically exposes large closed pores which create visible flaws, vii) using thermoset re-densification of machined parts having visible flaws creates closed porosity, which can delaminate the external coating under heating in vacuum during the flight.

In thermal-structural applications there are six intrinsic limitations: i) only thermoset resin consolidation can utilize the use of commercially employed autoclave and vacuum bagging for making large very complex parts while thermoplastic consolidation requires hot pressing limiting it to flat structures [ACROSS Brochure 2021, China patent CN 111133835A] unless extremely expensive hot isostatic presses are employed especially for large structures combined with the need to create gas permeability blankets encapsulating the parts, ii) C—C composites made via thermoset consolidation contain closed porosity, which upon heating in vacuum creates delamination, since the inert gas trapped inside the closed pores during heat treatment exerts high pressure on the pores walls during heating in vacuum per ideal gas law plus the pressure differential and can only escape by breaking up the gas impermeable vitreous carbon matrix surrounding it and creating delamination manifested even during benign Chemical Vapor Deposition heating up rates [Kowbel 1991 and 1993]. In flight low pressure and rapid heating rates are encountered and such delamination can very likely cause catastrophic failure. iii) very low thermal conductivity, less than 50 W/mK [Toyo Tanso CC brochure 2021], iv) very low interlaminar shear strength (ILS), 2.2 ksi [SGL CC Brochure 2021], v) low interlaminar tensile strength (ILT) 1.5 ksi [Kowbel 1995] and vi) high modulus of 75 GPa associated with high tensile strength of 220 MPa [Kobuyashi 2009].

BRIEF SUMMARY OF THE INVENTION

This innovation has eight distinctive elements as briefly discussed below.

First element is totally novel and unique consolidation method for making C—C composites. This new, highly innovated method relies on functional tailoring of surface functional groups, hydroxyl, carbonyl and carboxyl. introduced by different surface treatments of either non-crystalline or crystalline carbon fillers. The key parameter is the primarily contribution of carboxyl group on the filler surface. In order to achieve stable slurries with the solid content up to 45% and strong chemical bonding between the resin and the functionalized filler the contribution of carboxyl group must be over 50% while the contribution of the hydroxyl group must be under 10%. Subsequently, a stable slurry is achieved using functionalized filler, a thermoset resin and organic solvent via steric stabilization of the functionalized filler due to its functional groups interaction with the solvent. Steric stabilization required no filler solubility in isopropyl alcohol (IPA). No filler solubility in IPA was correlated with no agglomeration and no sedimentation as the conditions for creation of stable suspension. No filler solubility in IPA is the necessary but not sufficient requirement for achieving stable suspension at high loading. Thus, the process quality control uses both: non-solubility in IPA as the screening test and actual suspension stability, e.g no sedimentation and no agglomeration as the sufficient requirement.

Thus, this innovation precludes prior innovation stated above such as use of IPA soluble, non-functionalized green carbon coke filler as the basis for this process. A radical departure from prior art usage of non-functionalized green carbon coke filler is due to the optimum surface treatment of green carbon coke filler. As stated above the optimum surface treatment requires sufficient presence of carboxyl group on the filler surface. The use of stable slurries, highly loaded with functionalized carbon filler enables the ability to achieve uniform distribution of carbon filler in both intra and interbundle matrix. As the result no closed porosity is created enabling very high-density C—C which is a radical departure from prior art.

Second element of this innovation is the formation of strong chemical bonding between surface treated carbon filler and a thermoset resin. Particularly, in the case of a phenolic resin, ester bonding is formed upon a reaction between carbon filler carboxylic group and phenolic resin hydroxyl group.

The presence of such strong, ester type chemical bond constitutes radical departure from prior art. The strength of the bond must be sufficient to cause chemically induced graphitization as stated below.

Third, element is chemically induced graphitization which is a totally new scientific principle, starkly different from physically induced graphitization of the prior art as discussed in the previous section. The presence of carboxyl surface functional group enables chemical interactions between surface functionalized filler and phenolic resin, resulting in chemically induced graphitization upon high to very high temperature heat treatments.

That is entirely, NEW and totally different scientific principle of graphitization causing: i) full graphitization of non-graphitizable PAN-based carbon fibers, ii) enhanced graphitization of pitch-based fibers, iii) full graphitization of non-graphitizable thermoset-based carbons; none of each is inherently possible by the prior art scientific principle of physically induced graphitization. This element of the innovation is the FIRST CRUX of the innovation.

Fourth element of the innovation is the ability to make up to 12" thick C—C composites using carbon fabrics with excellent properties and insignificant scatter through the thickness of physical, thermal and mechanical properties.

That is in total departure from the prior art of processing of C—C composites as stated above.

Fifth element of the innovation is the total elimination of carbonization required in prior art Sixth element of the innovation is the creation of zero closed porosity in the phenolic-derived carbon matrix, which in combination with unique pitch impregnation enables the creation of very high density, as high as 2.15 g/cm$^3$ density at 12" thickness with less than 2% open porosity. That is a total departure from prior art as stated above.

Seventh element of the innovation is very significant increase in transverse mechanical properties, ILS and ILT over prior art. This increase is due chemical bonding between the functional filler and the thermoset which greatly enhances the strength of fiber/matrix interface and such phenomenon is not part of the prior art.

Eight element of the innovation is the creation of totally new properties in C—C composites, which can be achieved on as thick as 12" C—C composites and were never before achieved and intrinsically possible with the prior art C—C composite processing.

Thus, carbon fiber either pitch or PAN-based can reach almost 1,100 W/mK thermal conductivity, while the intra-bundle matrix can reach thermal conductivity of about 850 W/mK and the interbundle matrix can reach thermal conductivity in excess of 550 W/mK using thermoset-based consolidation process yielding C—C composite thermal conductivity of 675 W/mK Very high transverse mechanical properties can be achieved: ILS of 4,5 ksi and ILT of 2.85 ksi. These properties can be achieved on thickness up to 12". In addition, very low modulus of only 20 GPa can be achieved combined with high tensile strength of 320 MPa and with 225 W/mK thermal conductivity after a 2200° C. heat treatment for aero structures.

In addition to its eight distinctive elements, the innovation has clear advantages over the prior art of making C—C composites as enumerated below: i) no closed Porosity thermoset consolidation is absolute paradigm shift in making air breathing, very complex, very large structures and enabling highly reliable design of air breathing vehicles in contrast to the prior art.

The intrinsic closed porosity in the prior art C—C composites 100% hinders any reliable vehicle design, since no testing can fully account for in flight delamination caused by closed porosity, ii) use of PAN-based carbon fibers in lieu of pitch fibers required by the prior art for high thermal conductivity composites is a paradigm shift removing the highly limiting reliance on high cost, only available in small quantities weavable pitch fibers like P-30X, iii) increasing thermal conductivity from 445 W/mK (achieved only on thin C—C composites in the prior art) to 675 W/mK achieved on up to 12" thickness is a paradigm shift enabling a new class of leading edges for air breathing vehicles and the greatly increased thermal conductivity lowers the stagnation point allowing the use of commercial external coatings, iv) almost double transverse strength, both ILS and ILT over the prior art greatly enhances the design reliability of air breathing vehicles, v) lowering 75 GPa modulus of prior art C—C composites to only 20 GPa while maintaining high tensile strength greatly reduces thermally induced stress in air breathing vehicles and greatly increases their reliability, vi) increasing 45 W/mK thermal conductivity for prior art thermal structural C—C composites to 225 W/K under this innovation enables greatly reduced thermally induced stress for air breathing vehicles greatly increasing their reliability.

DETAILED DESCRIPTION OF THE INNOVATION

Figure 1:
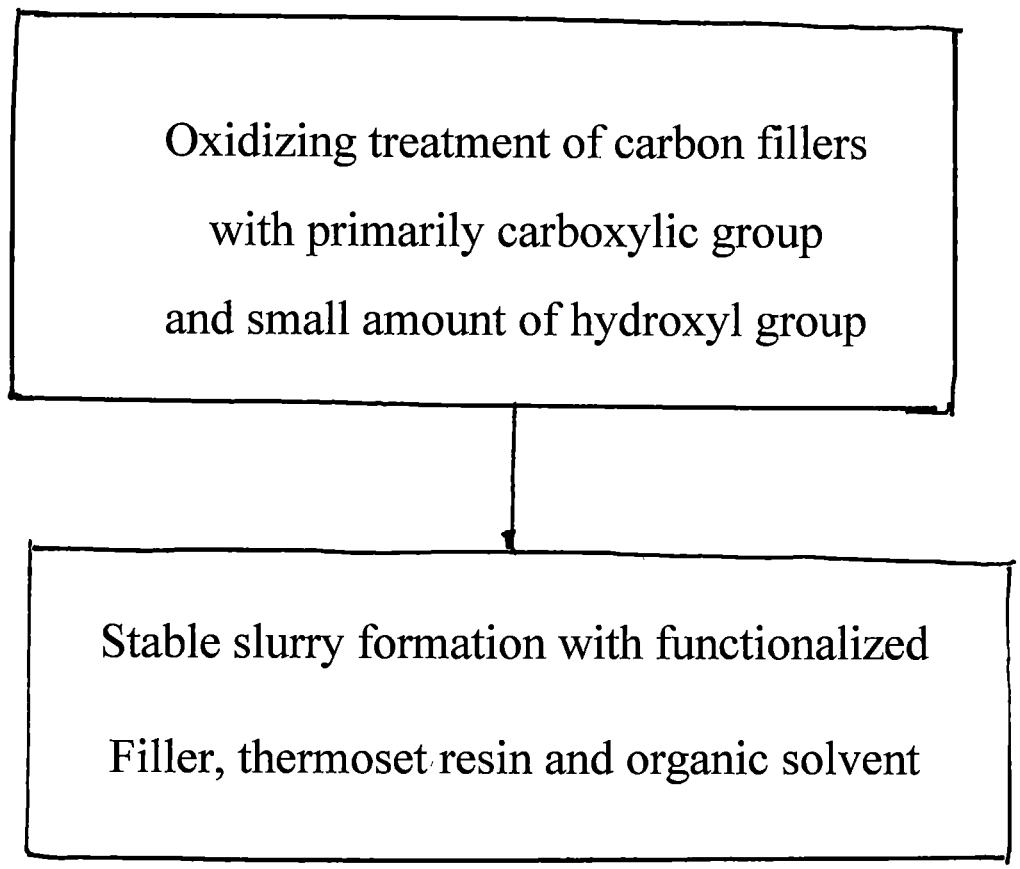
FIG. 1 shows a schematic of the stable slurry formation under this innovation.
Figure 2:
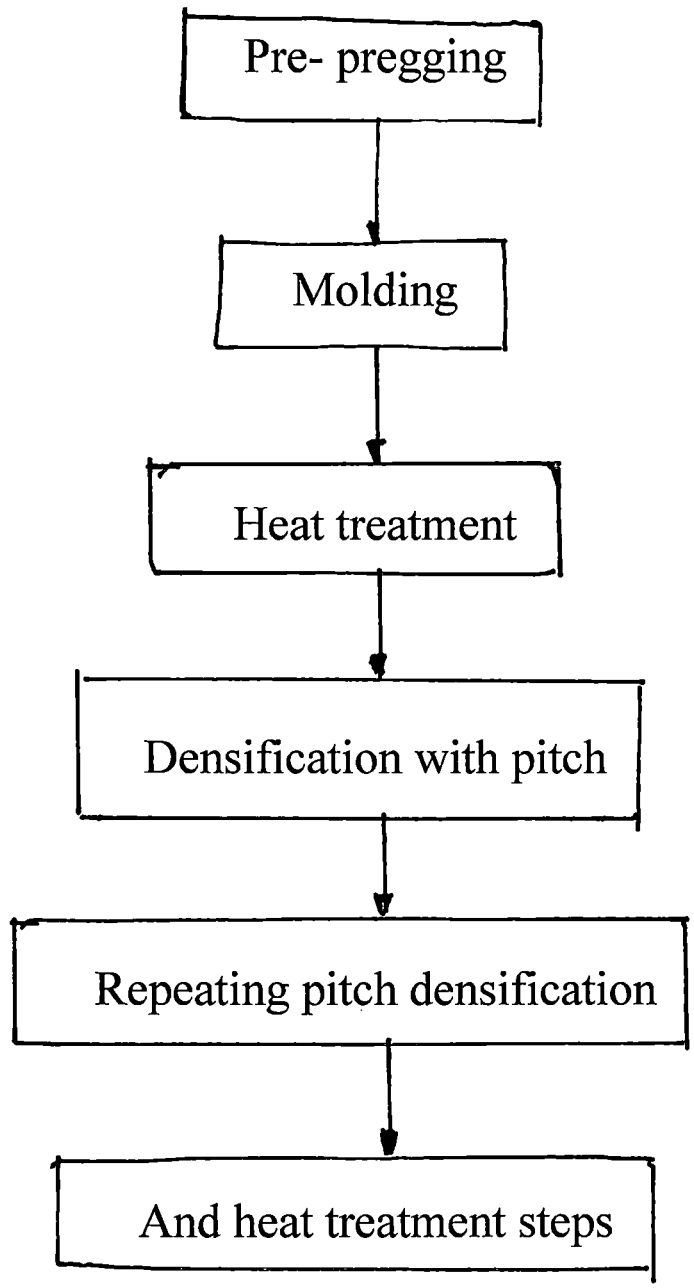
FIG. 2 shows the processing steps involved in making the C—C composite under this innovation.

There are eleven key elements of this invention, two as defined in FIG. 1 as pertinent to slurry preparation and nine as discussed in FIG. 2, as pertinent to composite processing. FIG. 1 has the following elements, i) use of functional, surface treated green carbon coke, calcined coke, carbon black or natural graphite filler, ii) use of novel stable slurries. FIG. 2 has the following elements: i) use of novel pre-pregging ii) use of novel molding methods allowing up to 62 wt % fiber volume in thick C—C composites, iii) elimination of carbonization process, iv) use of novel liquid impregnation, v) conversion of "non-graphitizable" phenolic-derived matrix into highly graphitic, highly orientated microstructure, vi) conversion of turbostratic PAN-derived carbon fibers into highly graphitic and highly orientated microstructure, vii) greatly enhanced crystallization and orientation of pitch-based fibers, viii) formation of carbon matrix derived from a thermoset resin which has no closed porosity but only 100% open porosity.

All the eleven elements of the innovation stated above are discussed in detail below.

1. Surface Treatment of Carbon Fillers to Achieve Desired Surface Functionality.

Four types of carbon fillers used in this innovation are first ground to three different particle size distributions. The fillers are: green carbon coke, calcinated coke, carbon black and natural graphite filler. Three particle size distributions are: 1.5 micron average, 1 micron average and 0.5 micron average. The use of smaller filler size than 0.5 micron created very high viscosity increase of the slurry while large than 1.5 micron size has limited ability to infiltrate the intrabundle matrix.

Surface of both crystalline carbon fillers: carbon black, calcinated coke, natural graphite filler and non-crystalline carbon filler such as green carbon coke contains only chemically bonded hydrogen. Oxidizing surface treatments such as: air oxidation, nitric acid treatment and oxygen plasma treatments in a successive manner introduce first hydroxyl group, then carbonyl group and finally carboxyl group. For the purpose of proving this innovation air oxidation was employed. Oxidation of carbon materials is primarily confined to prismatic edges. As discussed by Dresselhaus highly graphitic materials have very low density of prismatic edges (primarily basal planes) while very poorly organized carbons like green carbon coke have very large density of prismatic edges. As stated in the section above, primarily presence of surface carboxyl group was determined needed to achieve strong chemical bond with phenolic resin. Oxidation temperature was found to be the main factor affecting surface functional groups distribution. Thus, in order to achieve primarily surface carboxyl groups, in excess of 50% and less than 10% of hydroxyl group, the following surface treatments conditions were employed: i) for green carbon coke 1 hr air oxidation at 120° C., ii) for calcinated green carbon coke 1 hr air oxidation at 250° C., iii) for carbon black 1 hr air oxidation at 300° C. and for iv) natural graphite 1 hr air oxidation at 375° C. Several surface methods, including FTIR and XPS were used to confirm the required surface chemistry, primarily contribution of the carboxylic group of the functionalized non-crystalline and crystalline carbon fillers after air oxidation as stated above.

This element of the innovation is the radical departure from the prior art since no functionalized fillers were ever used in the prior art not to mention specifically functionalized fillers with significant amount of surface carboxyl group and only small amount of hydroxyl group. The functionalized filler surface chemistry under this innovation totally changes the behavior of the filler and the C—C composite in the prior art by the following features: i) converts prior art organic solvent soluble filler like green carbon coke into a non-soluble filler, ii) enables the formation of stable slurries at high solid content not intrinsically possible with using non-functional fillers in the prior art, iii) it introduces very strong chemical bond between filler and resin which causes chemically induced total graphitization of the thermoset-derived carbon matrix and PAN-derived turbostratic fibers entirely prohibited under prior art thermal and physically induced graphitization.

2. Formation of Stable Slurry with a Functionalized Filler.

Functionalized carbon fillers were mixed with isopropyl alcohol (IPA) soluble phenolic resin and IPA solvent. Stable slurries containing up to 45% of solid functionalized filler content were achieved as compared to about 10% solid content with non-functionalized, IPA soluble green carbon coke only achieved in the prior art.

Since carbon fabrics are woven to different areal density, the spacings between the fibers in some cases are under 1 micron, thus the following filler distributions were employed: i) single mode with 1.5 micron average size, ii) bi-modal with 1.5 micron and 1 micron size, and tri-modal with 1.5 micron, 1 micron and 0.5 micron filler size.

This element of the innovation is a radical departure from the prior art since; i) no stable slurries with high solid content were used, ii) no stable slurries with surface functional fillers were used, iii) no stable slurries with significant amount of carboxyl group on the filler surface were used, and iv) no multi-mode filler distributions were used.

3. Use of Novel Pre-Pregging.

This innovation due to creation of stable slurries enabled the use of both fiber tow/fabrics pre-pregging as well as the slurry resin transfer molding into a 2-D, 2-5 D preforms defined as stacked fabrics layers and a 3-D preform. The key element of this innovation is the ability to form very strong chemical ester bonding between the functionalized filler carboxylic group and the resin hydroxyl group during molding of the pre-pregg or the infiltrated preform.

This element of the innovation is a radical departure from the prior art since: i) in the prior art the pre-pregg or the preform forms no chemical bonding between the un-functionalized filler and the resin, ii) resin transfer molding of very high solid content slurry was not used in the prior art since it is not intrinsically possible under prior art, 4. Molding Typical molding time-pressure-temperature protocols are not capable of creating up to 62 wt % fiber, in up to 12" thick C—C composites. A molding scheme was invented to allow by-products of phenolic curing to be released up to 12" thickness with no trapping inside the composite.

The key elements of this innovation are: first around 90 F allow pre-consolidation of the pre-preggs to greatly reduce the volume and then gradually increase the pressure between 90 F to 180 F, hold at 180 F and then gradually increase the pressure between 180 F and curing temperature of 350 F. Molding can be accomplished by at least three methods: i) compression molding, ii) vacuum bagging, and iii) autoclave molding. Both very thick flat parts and very complex, very large parts can be molded.

As stated above very strong ester chemical bonding was formed between functionalized filler carboxylic surface functional group and the phenolic resin hydroxyl functional group as confirmed by FTIR analysis of the as molded composite. This is the second CRUX of the innovation This element of the innovation is a radical departure from the prior art since critically no chemical bond between carbon filler and the resin is formed in the prior art during molding, which differentiates prior art starkly from this innovation, where the formation of very strong ester bond between resin functional group and the functionalized filler surface functional group exists. The presence of this very strong bonding enables the unique innovations listed below, intrinsically impossible under prior art C—C composites processing.

5. Elimination of Carbonization Process

High thermal conductivity C—C composites require heat treatment in excess of 2200° C. Prior art processes for thick C—C composites require carbonization prior to graphitization in order to prevent delamination.

This innovation enables taking C—C composites at any processing stage directly to temperatures as high as 3200° C. Elimination of carbonization is possible since no closed porosity and no micro-delamination is formed under this innovation.

Elimination of the carbonization step, which is the intrinsic requirement of the prior art starkly differentiates this innovation from the prior art.

6. Use of Novel Liquid Infiltration to Achieve Density of C—C Composites in Excess of 2.1 g/Cm³ for Up to 12" Thick C—C Composites.

Only pitch impregnation is intrinsically capable of densifying uniformly up to 12" thick C—C composites. But the highest density commercial graphite has density under 2.0 g/cm³. The innovation is to use very high pressure, in excess of 200 psi pitch impregnation in a multi cycles applications, followed by vacuum application to infiltrate the open porosity as small as a few nanometers size.

This innovation is a radical departure from the prior art, primarily developed for graphite impregnation which does not allow for the infiltration of a very small size pores.

7. Conversion of Phenolic-Derived Matrix into a Highly Graphitic Matrix.

Prior art carbons derived from phenolic resins are referred to as "non-graphitizable carbons" since virtually all carbon-derived from phenolic charring is vitreous carbon. The present innovation by the formation of stable slurries and very strong chemical interactions between the functionalized fillers surface functional carboxyl group and a thermoset resin hydroxyl group introduces chemically induced graphitization, rendering highly graphitic matrix in TOTAL contrast to vitreous carbon matrix of the prior art.

This element of the innovation is a paradigm shift in thermoset consolidation of C—C composites processing, since the thermoset-derived carbon matrix in the prior art is virtually ALL virtuous carbon exhibiting very low thermal conductivity, while the phenolic-derived matrix under this innovation is highly graphitic, exhibiting very high thermal conductivity.

8. Conversion of PAN-Based Carbon Fibers into Highly Graphitic Fibers.

Prior art PAN-based carbon fibers even after very high temperature heat treatment with or without the presence of carbon matrix exhibit turbostratic carbon structure, a few nanometers crystallites sizes, rendering low to moderate thermal conductivity. The present innovation creates chemically induced graphitization rendering highly graphitic microstructure, resulting in very high thermal conductivity C—C composites made with PAN-based carbon fibers as stated below, never before achieved with PAN-based carbon fibers.

This element of the innovation is a paradigm shift in the use of PAN-based carbon fibers as the reinforcement in C—C composites since the PAN-derived carbon fibers are turbostratic carbons exhibiting low to moderate thermal conductivity, while the PAN-derived carbon fibers under this innovation are highly graphitic, exhibiting very high thermal conductivity.

9) Greatly Enhanced Crystallization and Orientation of Pitch-Based Fibers.

Prior art C—C composites made with weavable pitch fibers, e.g P-30X yield fiber thermal conductivity, around 650 W/mK. Pitch fibers are intrinsically capable of reaching around 1100 W/mK thermal conductivity (K-1100 fiber) but less than 700 W/mK weavable pitch fibers were used for thermal applications in the prior art. K-1100 pitch fiber can not be woven and its production was discontinued. The present innovation allows enhanced pitch fiber graphitization and crystallites orientation due to chemically induced graphitization created by stable carbon fillers suspension and the very strong chemical interactions between fillers and a thermoset resin. This innovation enables fabrication of C—C composites, with fiber thermal conductivity approaching 1100 W/mK using the fibers which can be woven.

That is a drastic departure from the prior art weavable pitch fibers demonstrated to exhibit only thermal conductivity of only 650 W/mK even after very high, 3000° C. heat treatment.

10. Achieving No Closed Porosity Matrix C—C Composites Via Thermoset Consolidation.

This innovation enables a total breakthrough in the C—C composites consolidation with a thermoset resin. The absence of closed porosity in a thermoset consolidation C—C composite processing is a TOTAL paradigm shift addressing the critical intrinsic limitation of thermoset-based C—C composites consolidation of the prior art C—C composites in the emerging hypersonic aero-shell applications.

Unlike ALL prior art C—C composites processing methods utilizing a thermoset consolidation, this innovation changed the intrinsic charring, carbonization and graphitization mechanism of a thermoset resin derived carbon matrix by rendering it 100% highly graphitic, no vitreous carbon in the matrix, having no closed porosity.

EXAMPLES

1. A matrix precursor was made using IPA, phenolic and surface treated green carbon coke. The surface treated green carbon coke was IPA non-soluble and enabled the formation of a stable suspension in IPA up to 45 wt % carbon filler loading. A C—C composite final thickness of 12", 16" by 16" was made by compression molding of 4:1 P-30X carbon fabrics, 55% fiber volume with the slurry, 3000° C. heat treatment and pitch densification. The final density was 2.15 g/cm³ and the open porosity of about 2% with less than 1% variation over the whole volume. The in-plane thermal, room temperature (RT), conductivity was 675 W/mK with less than 5% variation. The degree of graphitization parameter g was 0.98. The ILS was 1.8 ksi, ILT was 1.2 ksi with less than 10% variation throughout the whole volume. The final C—C composite had zero closed porosity.

2. A matrix precursor was made using IPA, phenolic and surface treated green carbon coke. The surface treated green carbon coke was IPA non-soluble and enabled the formation of a stable suspension in IPA up to 45 wt % carbon filler loading. A C—C composite final thickness of 12", 16" by 16" was made by compression molding of 4:1 PAN carbon fabrics, 55% fiber volume with the slurry, 3000° C. heat treatment and pitch densification. The final density was 2.15 g/cm³ and the open porosity of about 2% with less than 1% variation over the whole volume. The in-plane thermal, room temperature (RT), conductivity was 670 W/mK with less than 5% variation. The degree of graphitization parameter g was 0.97. The ILS was 1.86 ksi, ILT was 1.25 ksi with less than 10% variation throughout the whole volume. The final C—C composite had zero closed porosity.

3. A matrix precursor was made using IPA, phenolic and surface treated green carbon coke. The surface treated green carbon coke was IPA non-soluble and enabled the formation of a stable suspension in IPA up to 45 wt % carbon filler loading. A C—C composite final thickness of 0.5", 16" by 16" was made by compression molding of stretch-broken 0/90 PAN-based carbon fabrics, 55% fiber volume with the slurry, 2200° C. heat treatment and pitch densification. The final density was 1.85 g/cm³ and the open porosity of about 2% with less than 1% variation over the whole volume. The in-plane thermal, room temperature (RT), conductivity was 225 W/mK with less than 5% variation. The ILS was 4,5 ksi, ILT was 2.85 ksi and the tensile strength was 320 MPa, while the modulus was only 20 GPa with less than 10% variation throughout the whole volume. The final C—C composite had zero closed porosity.

What is claimed is:

1. A method of making C—C composites, which comprises the steps of:

Oxidizing treatment of non-crystalline or crystalline carbon fillers, which introduces surface carboxyl group, which constitutes more than 50% of all carboxyl, carbonyl and hydroxyl surface functional groups with the contribution of surface hydroxyl group of less than 10%, and formation of a stable slurry, containing up to 45 wt % of solid content using the surface functionalized carbon filler with a thermoset resin and organic solvent, where the functionalized filler is not soluble or even partially soluble in the organic solvent, and reinforcement pre-pregging or carbon fiber pre-form infiltration with the stable slurry made with the functionalized filler and a thermoset resin using organic solvent, and molding of the pre-preggs or preforms, which results in the formation of ester chemical bonding between the functionalized filler surface carboxylic group and a thermoset resin hydroxyl functional group, capable of causing chemically induced graphitization, and heat treatment of the as-molded composite, which converts thermoset-derived carbon matrix and PAN-derived carbon fiber into a highly graphitic matrix and fiber, respectively via chemically induced graphitization, and densification via pitch impregnation to fill as small as a few nanometers size pores which enables less than 2% open porosity and no closed porosity.

2. The method of claim 1, wherein the carbon filler comprises at least one of: non-crystalline green carbon coke, crystalline calcinated coke, carbon black and natural graphite.

3. The method of claim 1 where oxidizing treatment includes but is not limited to air oxidation.

4. The method of claim 1, wherein the thermoset resin contains a hydroxyl functional group comprising at least one of phenolic resins and phenolic furfuryl resins.

5. The method of claim 1 wherein the organic solvent comprises isopropyl alcohol (IPA).

6. The method of claim 1 where carbon fiber is either pitch or PAN-based.

7. The method of claim 1 where the reinforcing fiber is in the form of the tow, 2-D fabrics, 2-5 D pre-form or 3-D pre-form or a discontinuous fiber.

8. The method of claim 1 where the heat treatment is in 1600° C. to 3200° C. range.

* * * * *